Figure 1:
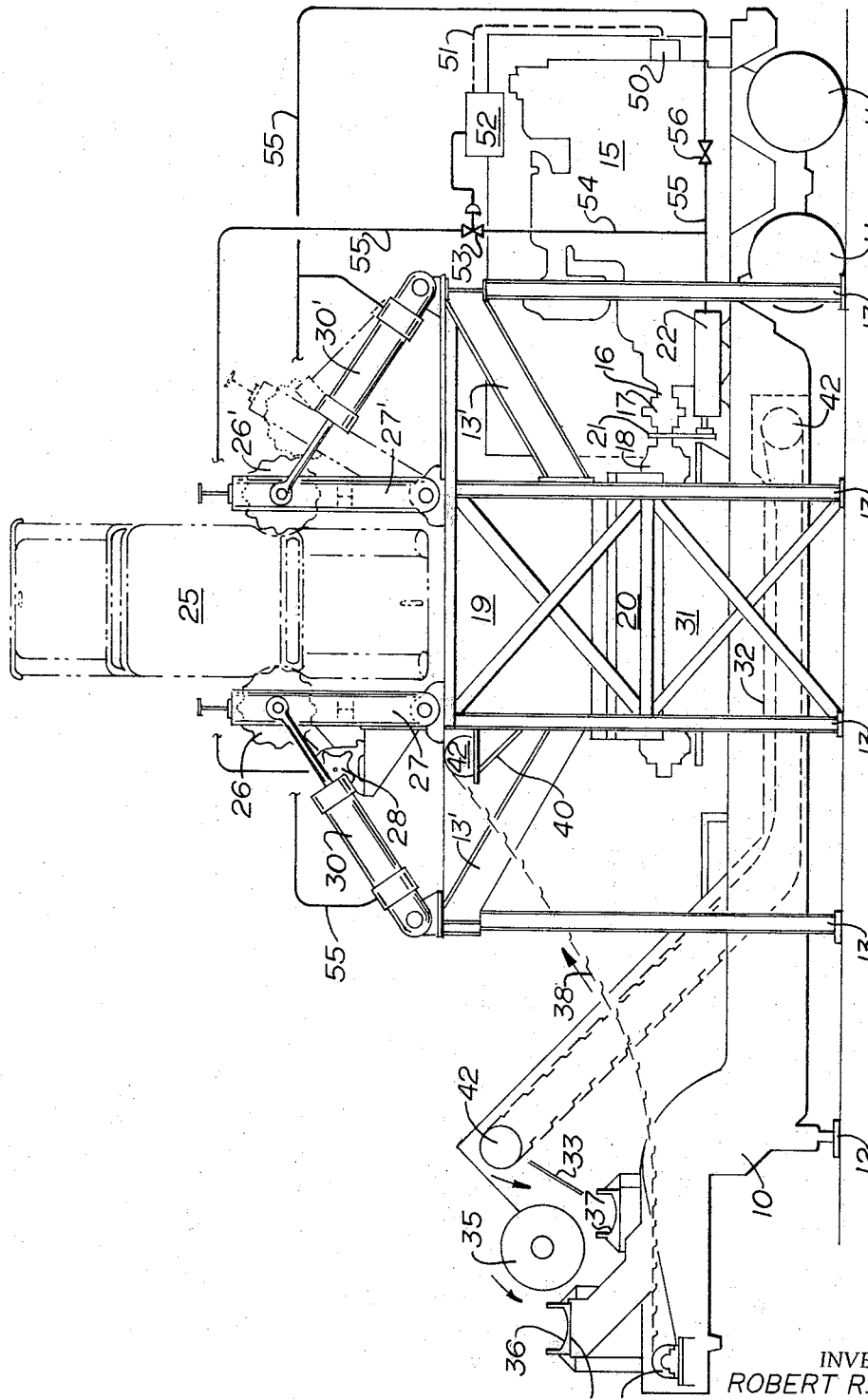

INVENTOR.
ROBERT R. YOUNG
BY
ATTORNEY

Patent text begins

3,335,968
SCRAP SHREDDING AND SEPARATING DEVICE
Robert R. Young, Danville, Calif., assignor to Kaiser Industries Corporation, Oakland, Calif.
Filed Feb. 5, 1965, Ser. No. 430,579
2 Claims. (Cl. 241—35)

This invention relates to a mobile scrap shredder and particularly to a device for converting low quality and low density sources of scrap such as junked automobile bodies and household appliances, into high grade and relatively dense ferrous scrap.

The most abundant sources of obsolete ferrous scrap are junked automobiles and household applicanes such as washing machines, refrigerators, hot water heaters, etc. Although the ferrous material contained in such junk is relatively valuable, it is contaminated with nonferrous inclusions such as copper wire, rubber insulation, glass, fabric, and paint, to mention a few, and these contaminating inclusions diminish its value. Furthermore, the sources of such scrap are usually remote from steel mills where it is used and the high volume per unit weight of such scrap makes transportation to a steel mill relatively expensive. For example, the large volume of an automobile body per unit of weight is such that a truck with enough volume to carry three automobile bodies could carry the ferrous material of perhaps 15 or 20 if those automobile bodies were reduced to a denser form and separated from nonferrous inclusions.

Recent developments in treating scrap have resulted in scrap shredders which reduce sources of scrap such as automobile bodies and appliances to relatively small shreds or flakes with a major dimension of perhaps 3" to 4" or less. The scrap shredders are ordinarily hammer mills which work in conjunction with breaker bars. Scrap fed into such hammer mills is torn apart into flakes and the force of the mill tends to remove adhering paint, enamel, etc. Scrap reducing hammer mills discharge a mixture of individual particles of ferrous and nonferrous material from which a conventional magnetic separator can substantially completely separate the ferrous portion from the nonferrous portion. The flakes of ferrous material pack densely into a truck or a railroad car thereby increasing the scrap-carrying capacity three to fivefold over its capacity to carry scrap in unreduced form. Thus, the scrap value of an applicance or automobile body can be increased by shredding, first because shredding permits purifying it in the removal of the nonferrous portions, and second because shredding creates a dense product so that it can be economically transported to steel mills or other places where it can be employed usefully.

In spite of the development of scrap shredders, the price of scrap is still too high to compete with other sources of ferrous material at all levels of use because it is still necessary to transport such scrap from local dealers to large scrap yards where a shredder is available. It is an object of this invention to provide a mobile scrap shredder capable of moving from place to place so that scrap can be shredded, purified and densified in local yards and thereby it will be capable of being shipped to markets economically.

Stationary scrap shredders may be built with enough power to handle whatever the prospective load is. Ordinarily, a stationary scrap shredder at a large scrap handling depot will be provided with electric power sources having 2,000–3,000 horsepower so that automobile bodies, for example, may be dropped into the inlet and milled to whatever size is desired. However, mobile units are necessarily limited. The axle weight that is permissible on roads will not permit 2,000 or 3,000 H.P. diesel engines to be transported and mills standing more than 12–15 ft. above the road bed cannot clear bridges, etc. and are therefore unsuitable. Furthermore, a mobile unit for use at various collection points for scrap must be capable of traversing unpaved areas and maneuvering within a scrap yard and through gates. Therefore, both the power and the size of a mobile scrap shredding unit are limited.

The mobile scrap preparing apparatus of this invention, in order to meet the criteria set forth above, includes a wheeled truck frame having assembled thereon a mill suitable for shredding scrap provided with a scrap inlet and a scrap outlet. The mill also contains, associated with its inlet, a scrap gripping and feeding means which is motor driven by a variable speed motor. The means for gripping and feeding scrap is regulated by a control system which includes means for measuring the speed of the mill and for regulating the speed of the scrap feeding means to be directly responsive to the speed of the mill. Specifically, as the mill speed diminishes the rate that scrap is fed into it diminishes and as the mill speed increases the rate that scrap is fed into the mill increases. The device of this invention also includes means such as a conveyor belt for removing shredded scrap from the mill outlet and a magnetic means associated with the scrap removal means for separating a magnetic or ferrous fraction from nonmagnetic or nonferrous fraction. There are also provided conveying means which separately convey the magnetic fraction and the nonmagnetic fraction to their respective collection points.

The device of this invention may include means for separating oversized ferrous scrap from the general shredded ferrous scrap fraction and returning the oversized portion to the mill for further size reduction and it desirably also contains a separating means for separating denser nonferrous material from less dense nonferrous material to further increase the value of the scrap. Since the denser nonferrous material is generally metallic, such as copper, and the less dense nonferrous material is generally nonmetallic, such as glass, paint, fabric, rubber, etc., the collection of a denser nonferrous fraction will produce a valuable product from the nonferrous scrap that would normally be discarded as trash.

One successful scrap shredding means that may be used in this invention is a rotating hammer mill provided with a nonrotating breaker plate or nonrotating breaker bars. Such a mill, within the limits of its power, very successfully tears and shreds large pieces of scrap such as fenders or body sections of an automobile or the enclosing metallic portion of washing machines, water heaters, etc. into small flake-like pieces of steel, and in shredding scrap it removes most, if not all, of the paint. The associated nonferrous material is also pulverized into small particles so that the ferrous material may be readily separated magnetically from the rest of the shredded scrap.

The feeding means of this invention preferably consists of hydraulically or pneumatically controlled jaws which grip large pieces of scrap and hold them firmly. The jaws move the scrap toward the mill at a controlled rate, either by rotating to move the scrap relative to the jaws while maintaining a grip or by moving with the scrap in a direction generally radial to the rotating mill and in a direction consistent with the orientation of the inlet which is usually in the form of a vertical or almost vertical chute or ramp. The operation of a hammer mill and gravity both tend to draw scrap into the mill and the relatively low-powered mill of this invention would be quickly overloaded so that it would jam or it would not reduce the scrap effectively to the size range desired, if the feed rate is unrestricted. The mill will generally be governed to run at a speed of 800–900 r.p.m. when unloaded. As scrap is fed into the mill the prime mover is loaded and the speed of the mill diminishes. The control system of this invention includes a conventional means for sensing the rotational speed of the mill, such as a tachometer and for introducing the sensed speed as the input signal into a control instrument which regulates the pneumatic or hydraulic means for feeding scrap into the mill responsive to that signal such that when the speed of the mill diminishes below a certain "set point" speed the rate at which scrap is fed will diminish thereby reducing the load on the prime mover so that the speed of the mill may return to the "set point" rate. In this way, the limited power source can handle loads that would normally require a more powerful stationary unit to process by controlling it to devote more time to shredding scrap. Conventional controllers may be used, for example, to regulate the setting of valves associated with a hydraulic or pneumatic system on the scrap feeding means thereby to regulate the rate at which scrap is introduced into the inlet to the mill.

The accompanying drawings illustrate a mobile scrap shredder embodying this invention and they are presented here to illustrate one suitable embodiment of the invention but are not intended to limit the scope of the invention to the mobile scrap shredder illustrated.

Figure 2:
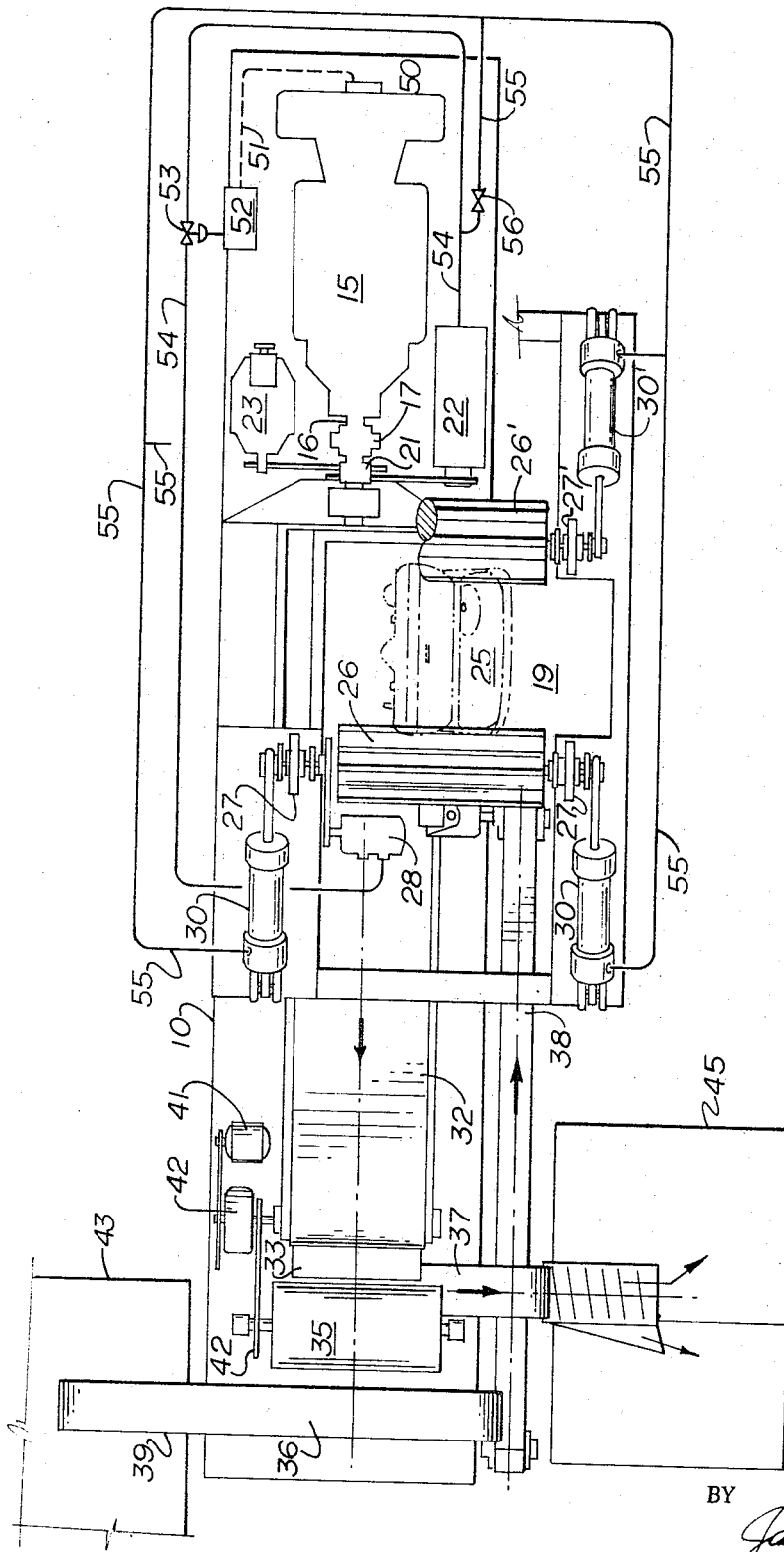

FIG. 1 is a schematic elevation view of a scrap shredder embodying this invention and FIG. 2 is a plan view of the shredder of FIG. 1.

In the drawings a truck frame 10 mounted on wheels 11 and adapted with foot 12 and hinged footings 13 stands firmly on the ground. Footings 13 are connected through hinged support members 13' to the main body of the structure and are capable of being folded compactly into the truck body while the unit is travelling on the road. A prime mover 15 such as a diesel engine is mounted on truck body 10. The prime mover transmits power to shaft 16 and coupling 17 into fluid coupling 18 which in turn causes a mill 20 to rotate at about the speed of the prime mover, usually 700–900 r.p.m. If desired, a transmission may be employed to convert the shaft speed to the desired mill speed when they are not the same. A power take-off 21 is also mounted on shaft 16 to operate hydraulic pump 22 and generator 23, the functions of which will be described hereinafter.

As illustrated in broken-lines, an automobile body 25 is placed in the inlet hopper 19 of the mill where it is gripped firmly with rotatable toothed jaws 26 and 26'. The jaws are capable of moving body 25 longitudinally of support elements 27 and 27' when they are rotated by motor 28, shown here as hydraulically operated motor. Hydraulic cylinders 30 and 30' move the elements 27 around lower pivots to grip tightly the automobile body 25. The elements 27 may be collapsed or removed by dismantling the pivots to prepare the device for travelling. A partly retracted position of these elements is shown in broken lines. Operation of the motor 28 will lower body 25 into the mill 20 at a rate such that it may be milled to a shredded scrap product which discharges through a discharge hopper 31 onto a belt 32.

Belt 32 carries the shredded scrap product upwardly and discharges onto a chute 33 adjacent a magnetic roll or drum 35. The ferrous or magnetic material in the shredded scrap product is carried by drum 35 to conveyor 36 while the nonmagnetic material falls through hopper 33 onto conveyor 37. Conveyor 36 is preferably a screen through which shredded scrap falls onto belt 39, and the ferrous material on conveyor 39 is carried to collection point 43, illustrated as a truck. In this embodiment of the invention the oversize material on conveyor 36 discharges onto conveyor 38 which returns it to chute 40 and into the inlet hopper 19 of the mill 20.

The nonferrous material is carried on conveyor 37 to a collection point, shown in this embodiment as a divided box 45 where a density separation is made to separate more-dense nonferrous material from less-dense nonferrous material. The more-dense nonferrous material will contain the nonferrous metals in the shredded scrap material.

The generator 23 is employed to produce electric power to drive motor 41 which operates the various belt and conveyor driving mechanisms all indicated as 42. These drives are effected through conventional means such as chain drives or V-belt drives and appropriate speed reducers. Although only one motor 41 is shown, obviously any number of electric motors may be used for the belt driving systems.

The hydraulic pump and accumulator 22 is employed to operate motor 28 and cylinders 30 and 30'. The motor 28 is operated with high pressure hydraulic fluid supplied through line 54 which is controlled by control valve 53. In the present invention, a speed sensing mechanism 50 such as a tachometer is employed on the shaft of the engine 15 and the sensed rotational speed is fed into controller 52 through means 51, conventionally a rotating cable or electric wire which carry a signal to controller 52 that is proportional to the rotational speed of the prime mover 15. Controller 52 operates valve 53 so that the rate at which hydraulic fluid is supplied to motor 28 is proportional to the speed at which the prime mover 15 rotates. Thus, a mill rotation speed may be preset on a "set point" on instrument 52. The mill speed will be selected to produce shredded scrap of the right size without jamming or overloading the mill 20. When overloading causes the speed of the mill to diminish below the set point speed, the reduced speed will be sensed at indicator 50 and transmitted to controller 52 which will in turn actuate valve 53 to slightly close it thereby reducing the rate at which automobile body 25 is fed into the mill. The reduced loading will permit the mill to regain the "set point" rotational speed. In this manner, the limited-power prime mover 15 permits the mill to shred scrap with varying characteristics without becoming overloaded or jammed due to its limited power supply. The feed control will also automatically accommodate the feed rate to the rate at which large pieces of scrap are recycled. A crane, which is not shown, will normally be used to place scrap between jaws 26.

Line 55, containing valve 56 carries hydraulic fluid to all of the various cylinders 30 and 30' to provide the force required to move jaws 26 and to grip scrap.

Having thus described the invention, what is claimed is:

1. A scrap shredder comprising a supporting structure having assembled thereon
   (A) A mill suitable for shredding scrap and provided with a prime mover, an inlet for scrap and an outlet for shredded scrap,
   (B) A scrap gripping and feeding means associated with said inlet and driven by a variable speed motor,
   (C) Means to measure the speed of said mill,
   (D) Means to vary the speed of said feed means motor responsive to the speed of said mill,
   (E) Means for removing shredded scrap from the mill outlet,
   (F) Magnetic means for separating said shredded scrap into a magnetic fraction and a nonmagnetic fraction, and
   (G) Means for separating said nonmagnetic fraction into a more dense fraction and a less dense fraction.

2. The apparatus of claim 1 further characterized in that means are provided for separating oversized magnetic shredded scrap and returning it to the mill inlet.

(References on following page)

References Cited

UNITED STATES PATENTS

| | | | |
|---|---|---|---|
| 1,450,720 | 4/1923 | Gassman | 241—35 |
| 1,691,101 | 11/1928 | Winkler | 241—35 |
| 1,742,434 | 1/1930 | Costello | 241—35 |
| 1,871,499 | 8/1932 | Crago | 318—39 |
| 1,962,778 | 6/1934 | Kranick | 241—35 |
| 2,150,984 | 3/1939 | Near | 29—4.5 |
| 2,613,878 | 10/1952 | Hailey | 241—35 |
| 2,692,677 | 10/1954 | Bosqui. | |
| 2,768,794 | 10/1956 | Putnam. | |
| 2,965,316 | 12/1960 | Henderson | 241—76 X |
| 2,971,703 | 2/1961 | Rath | 241—76 X |

WILLIAM W. DYER, Jr., *Primary Examiner.*

HARRY F. PEPPER, Jr., *Examiner.*